March 27, 1962 J. D. ALLEN, JR 3,027,549

MAGNETIC TRANSDUCER

Filed June 6, 1956

INVENTOR.
JAMES D. ALLEN
BY John B. Clark
ATTORNEY

United States Patent Office 3,027,549
Patented Mar. 27, 1962

3,027,549

MAGNETIC TRANSDUCER

James D. Allen, Jr., Santa Clara County, Calif., assignor to International Business Machines Corporation, New York, N.Y., a corporation of New York Filed June 6, 1956, Ser. No. 589,761
2 Claims. (Cl. 340—174.1)

The present invention relates generally to data storage apparatus and more particularly to a transducer arrangement for sensing data recorded in the form of magnetic bits.

In certain applications it is convenient to record data in the form of printed bits which are sensed either photoelectrically, magnetically, or otherwise, and in some of these applications it is desirable that static reading, i.e., reading where there is no relative motion between the transducer and the bits, be possible. This invention is directed to an improved arrangement for sensing data magnetically, which arragement is capable of static sensing as well as dynamic sensing. Various schemes for static sensing have been employed in the past and these schemes have not proved altogether successful for one reason or another. The balanced bridge type of magnetic transducer, for example, requires critical magnetic balancing and shielding. In the present invention improved apparatus has been developed whereby magnetic data recorded upon a suitable recording medium can be sensed electromagnetically and reproduced electrically with or without relative motion between the recording medium and the transducer.

It is one object of the present invention, therefore, to provide an improved sensing apparatus capable of both dynamic and static sensing.

According to the present invention a tuned circuit is provided wherein the frequency of the tuned circuit is determined by the presence or absence of data bits adjacent a head associated with the apparatus. Frequency changes are detected by a discriminator circuit, the output of which yields a pattern of signals corresponding to the data. In addition to the output signals being independent of the relative motion between the head and the recording medium, the apparatus disclosed herein yields signals having a high signal-to-noise ratio for reasons well known to those familiar with the principles of frequency modulation.

Thus, it is a further object of this invention to provide an apparatus for sensing magnetic data and having an improved signal-to-noise ratio.

A still further object is to provide a magnetic transducer responsive to both "hard" and "soft" bits, i.e., to bits having a high remanence as well as to those having a low remanence.

Another object is to provide a transducer responsive to the reluctance of bits for creating signals representative thereof.

Other objects of the invention will be pointed out in the following description and claims and illustrated in the accompanying drawings, which disclose, by way of example, the principle of the invention and the best mode which has been contemplated of applying that principle.

Figures 1, 2:
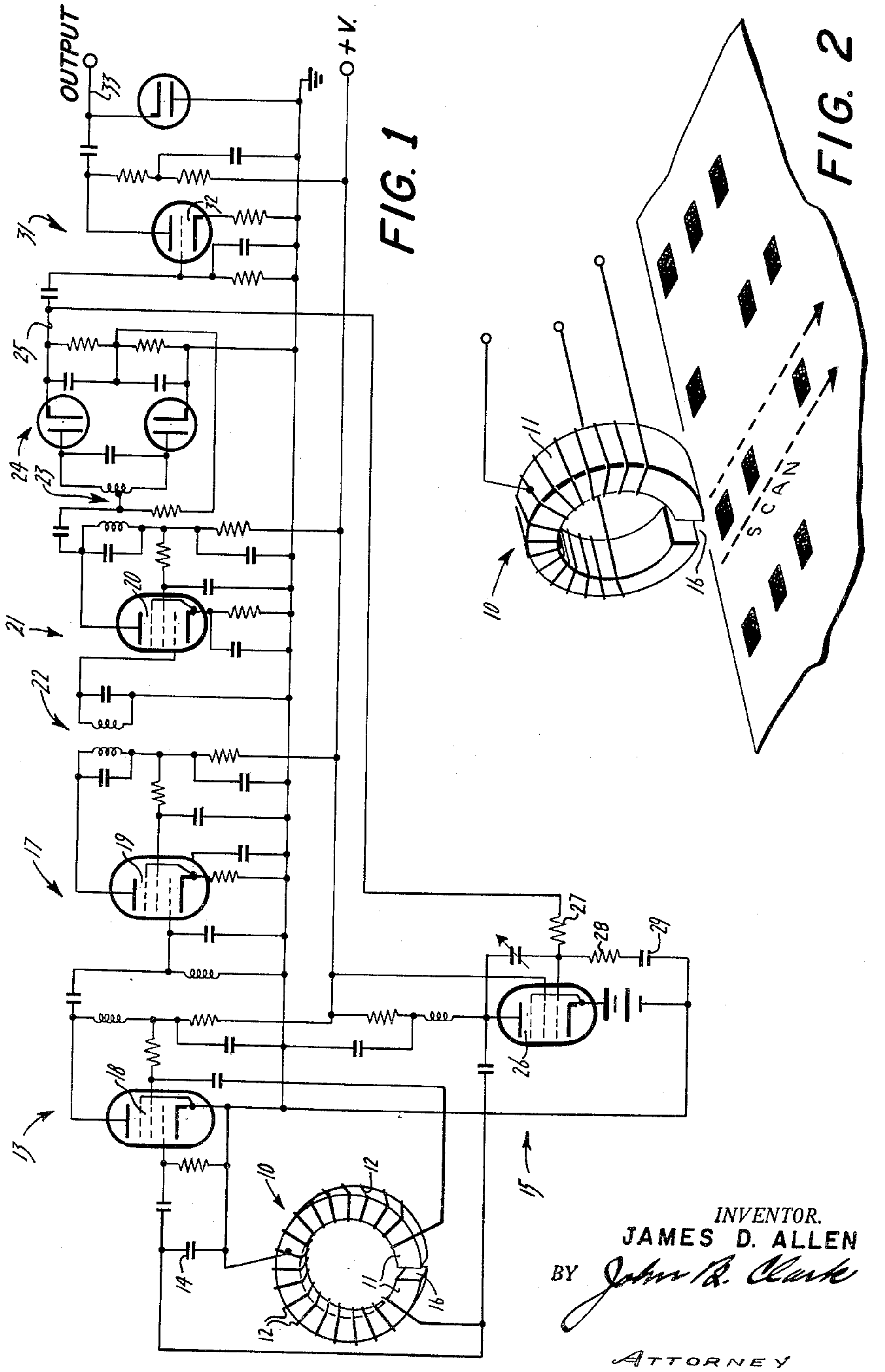
FIG. 1 is a schematic diagram of an embodiment of the invention.
FIG. 2 is a perspective view of the head associated with FIG. 1 and demonstrates a method of scanning data.

Referring now to FIG. 1, a head 10 comprising a core 11 of ferrite or the like and a winding 12 is provided to the sense data recorded in the form of magnetic bits on a non-magnetic surface. In the present embodiment the winding 12 serves as the inductance portion of a Hartley oscillator 13. A fixed condenser 14 together with the capacity provided by a reactance tube circuit 15, to be described, furnish the capacitance of the oscillator circuit. Forgetting for the moment about the circuit 15, the frequency of the oscillator 13 is controlled by the inductance of the winding 12 which, in turn, is controlled by the presence or absence of magnetic bits adjacent a gap 16 provided in the core 11. Assuming, for example, that no bit is at the gap 16, it will be clear that there is less inductance than when a bit is at the gap, the bits being of low reluctance magnetic material, thereby rendering the oscillator operative at a frequency higher than when a bit is at the gap. This is true since the reluctance of the core 11 is higher when no bit is present, thereby raising the frequency (inductance varies inversely with reluctance and frequency varies inversely with inductance). Thus, the frequency of the oscillator circuit determines the presence of a bit, and it is unimportant whether or not there is any relative motion between the head 10 and the recording medium since velocity in no way affects the inductance of the winding 12.

To facilitate sensing of a change in frequency, i.e., to yield greater changes in frequency when bits are sensed, a multiplier-amplifier stage 17 is provided. In the present embodiment the frequency of the oscillator 13 is in the neighborhood of 1500 kc., although any convenient frequency may be used, and the output of the multiplier stage 17 is tuned to a frequency of 4500 kc. Thus, the signal generated by the oscillator is tripled by the stage 17 and any difference in the frequency of the oscillator caused by the presence or absence of bits at the gap of the head 10 is also multiplied by three, thereby making the frequency shift easier to detect.

The plate of the tube 18 of the oscillator 13 is coupled to the control grid of a tube 19 of the multiplier-amplifier stage 17, the control grid of the tube 20 of an amplifier 21 being inductively coupled by a transformer 22 to the plate of the tube 19. Both the primary and secondary of the transformer are tuned to the 4500 kc. frequency, the tuning being sufficiently broad to permit passage of all fequencies involved, and the plate of the tube 20 is coupled through a transformer 23 to a frequency discriminator circuit 24. The circuit 24 is well known and will not be described herein; for a comprehensive description of its operation reference may be had to pp. 585–588 of Terman's "Radio Engineers' Handbook" (McGraw-Hill, 1943) or to pp. 387–391 of Seely's "Electronic Tube Circuits" (McGraw-Hill, 1950). The circuit constants of the discriminator circuit 24 are such that when no bit is present at the gap 16, the D.-C. potential of a line 25, the output line of the discriminator, is equal to zero. However, when a bit is sensed, the frequency of the oscillator decreases, thereby causing the potential of the line 25 to drop. Thus, the presence or absence of bits is determined by the potential of the line 25.

It has been found desirable to provide a circuit for compensating for drift of the ocillator 13. It is for this purpose that the reactance tube circuit 15 is provided. The output line 25 is connected through an RC delay, having a large time constant, to the control grid of a tube 26 associated with the circuit 15. The plate of the tube 26 is coupled to one side of the winding 12. The circuit 15 is conventional and a description thereof may be had by reference to pp. 374–377 of the aforementioned book by Seely, and a further description thereof will not be given herein. It is the function of the circuit 15 to maintain the normal oscillator frequency constant to thereby normally maintain the output of the discriminator circuit 24 at zero D.-C. potential. It was mentioned above that a delay is disposed between the output line 25 and the grid of the tube 26. This delay includes resistors 27 and 28 together with a condenser 29 and is long with respect to the time necessary for scanning a character, thereby rendering the reactance tube circuit 15 inoperative for changing the frequency of the oscillator as bits are sensed. It will be understood, however, that if a bit is stationary under the gap 16 for a sufficient period of time the voltage of the line 25 will be caused to decrease gradually to zero due to the operation of the circuit 15, and if it is desired to operate the circuit of the invention in this manner, i.e., in the manner wherein bits are maintained at the gap 16 for extended periods of time, the delay must be made sufficiently long or else the reactance circuit must be omitted entirely.

The embodiment shown in the drawings is arranged for scanning data at a sufficient speed to permit the output of the discriminator 24 to be A.-C. coupled through a video amplifier 31, the line 25 being coupled to the control grid of a tube 32 of the amplifier 31, and positive output signals representative of sensed data are taken from a line 33 coupled to the plate of the tube 32. It will be clear that when pure static sensing is desired the amplifier 31 will be replaced by a D.-C. amplifier if such amplification is deemed necessary.

Thus, moving the head 10 relative to a medium containing magnetic bits in such a way that the bits are disposed sequentially at the gap 16 of the head causes the oscillator frequency to change sequentially, thereby permitting a pulse train to be taken from the output 33, which is representative of the sensed data. The output signal is independent of the speed of relative motion, no motion being required, and the signal-to-noise ratio is high, thereby yielding an improved and more reliable sensing apparatus.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for sensing data recorded in the form of magnetic spots comprising a tuned circuit, said circuit including a coil having an inductance determined by the presence or absence of said magnetic spots thereadjacent, an oscillator associated with said circuit and under the control thereof to oscillate at frequencies determined thereby, means responsive to frequency changes of said oscillator for developing first signals for controlling development of a pattern of data signals according to the pattern of magnetic spots disposed adjacent said coil, and means for compensating for drift of said oscillator for preventing erroneous signals from being developed.

2. The invention set forth in claim 1 wherein said last mentioned means includes a reactance circuit responsive to said first signals for varying the resonant frequency of said tuned circuit according to said signals, said reactance circuit being effective only after a delay interval which is greater than the period of time that a magnetic spot is disposed adjacent said circuit, whereby the resonance of said tuned circuit is operatively affected by erroneous signals due to drift of said oscillator and not by said data signals.

References Cited in the file of this patent

UNITED STATES PATENTS

| | | |
|---|---|---|
| 2,590,091 | Devol | Mar. 25, 1952 |
| 2,700,703 | Nordyke | Jan. 25, 1955 |
| 2,708,219 | Carver | May 10, 1955 |
| 2,858,505 | Shawhan | Oct. 28, 1958 |
| 2,870,270 | Nagai et al. | Jan. 20, 1959 |

OTHER REFERENCES

"Combined Reading and Writing on a Magnetic Drum" (McGuigan), Proceedings of the I.R.E., October 1953, vol. 41, Computer Issue, pages 1438–1443 (FIG. 3, page 1441 relied on).